(12) United States Patent  (10) Patent No.: US 8,526,564 B2
Carbonell et al.  (45) Date of Patent: Sep. 3, 2013

(54) TOP GUIDE INSPECTION FIXTURE

(75) Inventors: John R. Carbonell, Ooltewah, TN (US); Kristoffer V. Ostrander, Hixson, TN (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 691 days.

(21) Appl. No.: 12/965,966

(22) Filed: Dec. 13, 2010

(65) Prior Publication Data

US 2012/0148010 A1  Jun. 14, 2012

(51) Int. Cl.
*G21C 17/00* (2006.01)

(52) U.S. Cl.
USPC .......................................................... 376/249

(58) Field of Classification Search
USPC .......................................................... 376/249
See application file for complete search history.

(56) References Cited

U.S. PATENT DOCUMENTS

| 4,169,758 | A  | * | 10/1979 | Blackstone et al. | .......... 376/249 |
| 7,505,547 | B2 |   | 3/2009  | Russell, II et al. | |
| 7,769,123 | B2 |   | 8/2010  | Rowell et al. | |
| 7,798,535 | B2 |   | 9/2010  | Calhoun | |
| 2009/0141965 | A1 | * | 6/2009 | Ferlay et al. | ................... 382/152 |
| 2010/0296617 | A1 | * | 11/2010 | Rowell et al. | ................. 376/248 |

* cited by examiner

*Primary Examiner* — Timothy A Brainard
(74) *Attorney, Agent, or Firm* — Joseph C. Spadacene; Westinghouse Electric Company, LLC

(57) ABSTRACT

A fixture for performing visual inspections of the underside of the top guide of a boiling water reactor. The inspections are performed in the reactor vessel, under water, and includes a framed structure that rests on top of the top guide and supports a wheel track within a fuel assembly opening in the top guide, that follows the contour of the opening. A camera support, suspended from the frame, is then remotely, manually rotated to follow the contour of the wheel track as the fixture maintains the camera at a fixed angle and known constant distance from the underside of the top guide.

11 Claims, 6 Drawing Sheets

TOP GUIDE INSPECTION FIXTURE

BACKGROUND OF THE INVENTION

1. Field of the Invention

This invention pertains in general to the inspection of boiling water reactor internals and more particularly to the inspection of the underside of a top guide for a boiling water reactor.

2. Related Art

FIG. 1 is a sectional view, with parts cut away, of a typical reactor pressure vessel 10 for a boiling water nuclear reactor. During operation of the boiling water reactor, coolant water circulating in the reactor pressure vessel 10 is heated by nuclear fission produced in the core 12. Feedwater is admitted into the reactor pressure vessel 10 by a feedwater inlet 14 and feedwater sparger 16. The sparger 16 is a ring-shaped pipe that includes apertures for circumferentially distributing the feedwater inside the reactor pressure vessel 10. The feedwater from the feedwater sparger 16 flows downwardly through downcomer annulus 18, which is an annular region between the reactor pressure vessel 10 and the core shroud 20.

The core shroud 20 is a stainless steel cylinder that surrounds the core 12. Core 12 includes a multiplicity of fuel bundle assemblies 22; two arrays of which are shown in FIG. 1. Each array of fuel bundle assemblies 22 is supported at its top by top guide 24 and at the bottom by core plate 26. Top guide 24 provides lateral support for the top of the fuel bundle assemblies 22 and maintains correct fuel channel spacing to permit control rod insertion.

The coolant water flows downward through downcomer annulus 18 and into core lower plenum 28. The coolant water in the core lower plenum 28 in turn flows upward through the core 12. The coolant water enters fuel bundle assemblies 22 wherein a boiling boundary layer is established. A mixture of water and steam exits core 12 and enters core upper plenum 30 under shroud head 32. Core upper plenum 30 provides a standoff between the steam-water mixture exiting the core 12 and entering standpipes 34. Standpipes 34 are disposed atop shroud head 32 and in fluid communication with core upper plenum 30.

The steam-water mixture flows through standpipes 34 and enters steam separators 36, which may be, for example, of the axial-flow centrifugal type. Steam separators 36 substantially separate the steam-water mixture into liquid water and steam. The separated liquid water mixes with feedwater in mixing plenum 38. This mixture then returns to the core 12 via downcomer annulus 18. The separated steam passes through steam dryers 40 and enters the steam dome 42. The dried steam is withdrawn from the reactor pressure vessel 10 via steam outlet 44 for use in turbines and other equipment (not shown).

The boiling water reactor also includes a coolant recirculation system that provides the forced convection flow through the core 12 necessary to attain the required power density. A portion of the water is sucked from the lower end of the downcomer annulus 18 via recirculation water outlet 46 and forced by a centrifugal recirculation pump (not shown) into a plurality of jet pump assemblies 48 (only one of which is shown) via recirculation water inlets 50. The jet pump assemblies 48 are circumferentially distributed around the core shroud 110 and provide the required reactor core flow.

The United States Nuclear Regulatory Commission requires that for nuclear plant license extensions the reactor internals components subject to age degradation be inspected for deterioration through mechanism such as intergranular stress corrosion cracking. The previous method of inspecting the bottom side of the top guide was conducted with a single camera secured back on itself via a piece of tape such that the camera was pointed directly up. Inaccuracies in the motion and inspection angle were common using this method. Visual inspection criteria set forth in the EPRI Boiling Water Reactor Vessel and Internals Project (BWRVIP) Report-03 (Revision 12), requires the camera angle to be placed 30° or less from the perpendicular with a known distance from the inspection piece. BWRVIP-26A and BWRVIP-183 are both applicable to Top Guide examinations. Employing the previous method it was difficult to verify that the inspection was within the inspection criteria.

Accordingly, a new method is desired that can verify that the inspection criteria has been followed. More particularly, a new apparatus is desired that can carry out such a method and maintain a known camera angle and distance from the inspection piece as well as provide rigidity to keep flow induced impact on the inspection process at a minimum if not entirely eliminated.

SUMMARY OF THE INVENTION

The foregoing objectives are achieved by the apparatus of this invention which provides an inspection fixture for a top guide of a boiling water reactor. The inspection fixture includes a frame sized to rest and be supported on a top edge of a fuel assembly opening within the top guide. A wheel track is supported from the frame in a manner to extend around a periphery of the fuel assembly opening, substantially proximate a border thereof, when the frame is supported on the top edge of the fuel assembly opening. A central shaft is rotably supported from the frame and extends down below the fuel assembly opening, substantially along an axis of a fuel assembly to be positioned below the opening, when the frame is supported on the top edge of the fuel assembly opening. A linkage bracket is fixedly connected to the central shaft and extends laterally therefrom with a hinged distal link having a hinge line substantially parallel to and spaced from the central shaft. A cam follower rides on the wheel track and is supported from the distal link. An inspection sensor bracket is connected between the central shaft and the distal link for supporting a camera at a fixed angle to survey the underside of the top guide.

In one embodiment, the fixture includes a hard stop ring for preventing the central shaft from rotating more than approximately 380°. Preferably, the hinged distal link is spring-biased in a preselected orientation that is preferably at an angle of 0° with another portion of the linkage bracket between the hinge line and the central shaft.

In a preferred embodiment, the wheel track is substantially rectangular and preferably substantially square. Desirably, the wheel track is suspended from the frame within the fuel assembly opening in the top guide when the frame rests on the top edge of the fuel assembly opening and in one embodiment the wheel track sits just below the top surface of the top guide.

In another embodiment, the inspection fixture of this invention includes a coupling at an upper end of the central shaft for coupling with a drive means for rotating the central shaft. Preferably, the drive means includes a pole that connects to the coupling for positioning the inspection fixture on the top edge of the fuel assembly opening and rotating the central shaft.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
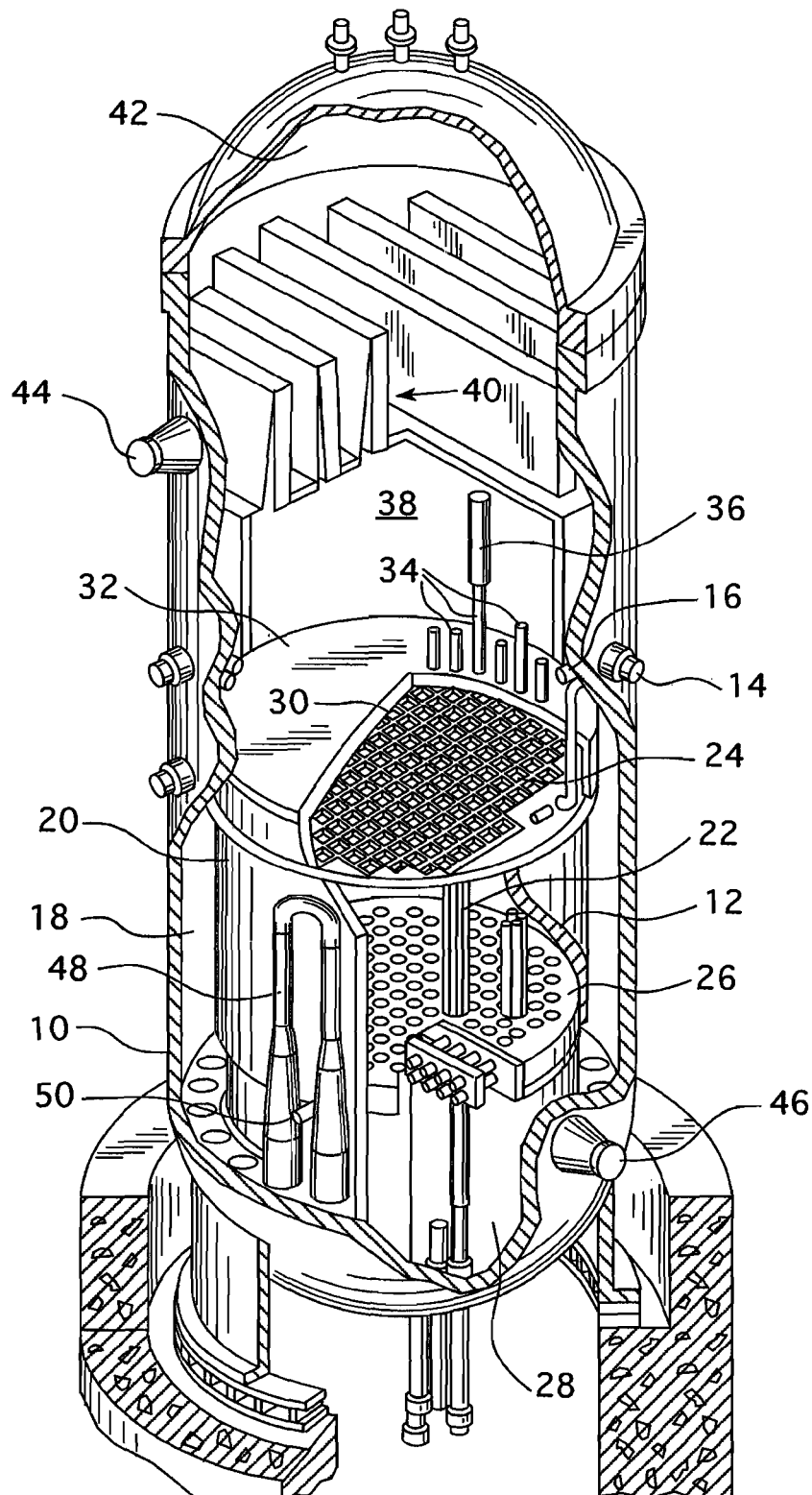
FIG. 1 is a sectional view, with parts cut away, of a typical reactor pressure vessel for a boiling water reactor.
Figure 2:
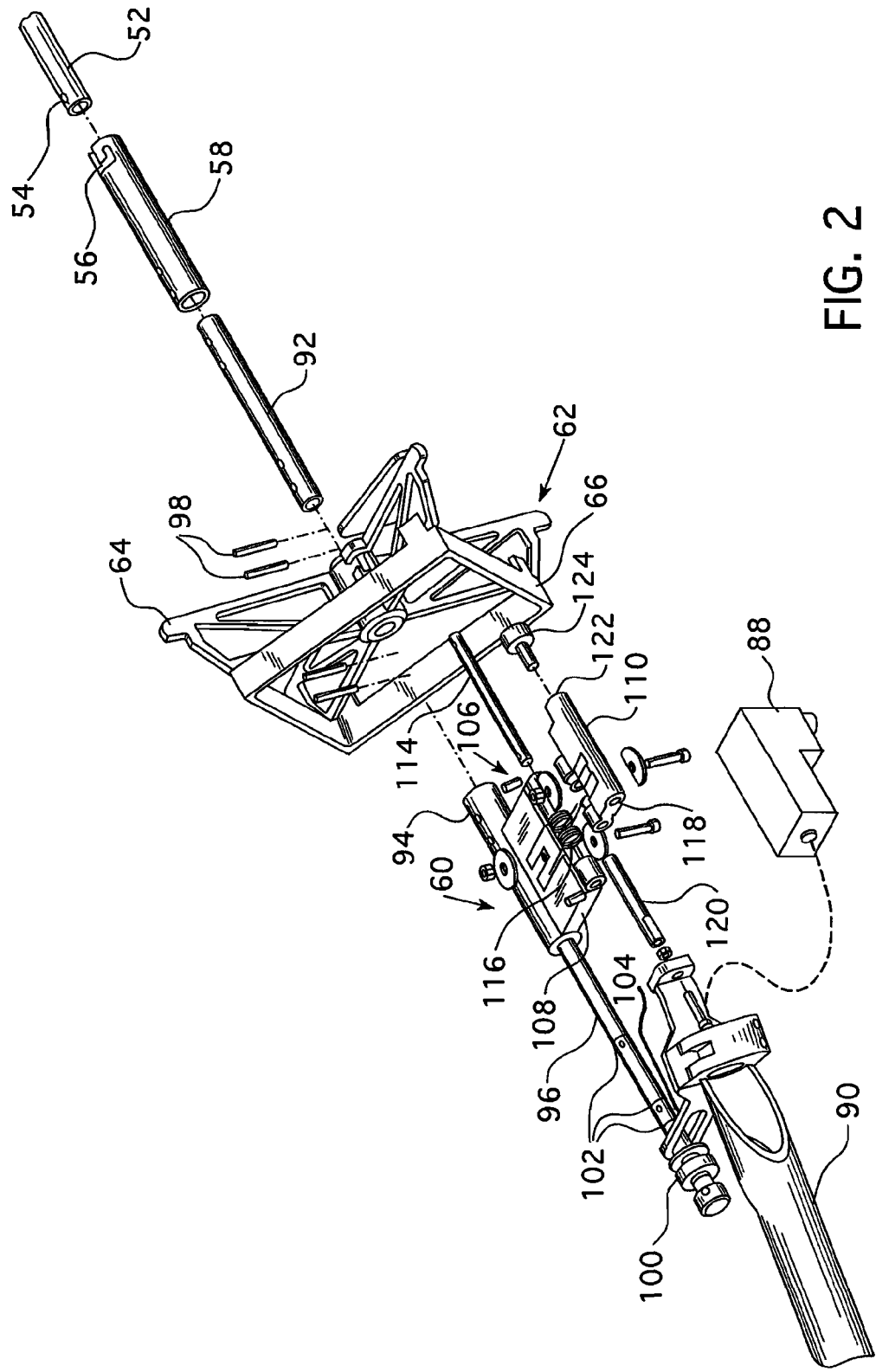
FIG. 2 is an exploded view of the inspection fixture of this invention.

The top guide inspection fixture of this invention is shown in the exploded view illustrated in FIG. 2 and is supplied from a reactor work platform by way of a small handling pole 52 that has a dimple 54 that fits in a J-slot coupling 56 in a distal end of a sleeve 58 which is the upper part of the central shaft 60 of the inspection fixture 62 of this invention. The small handling pole 52 sets the fixture 62 into the cell of the top guide, i.e., the fuel assembly opening. The fixture then allows for manual mechanical manipulation and rotation of a camera or other inspection sensor through the small handling poles to visually inspect the underside surface of the top guide to meet visual inspection requirements. The inspection can be performed in either a clockwise or counterclockwise direction, as desired.

Figure 3:
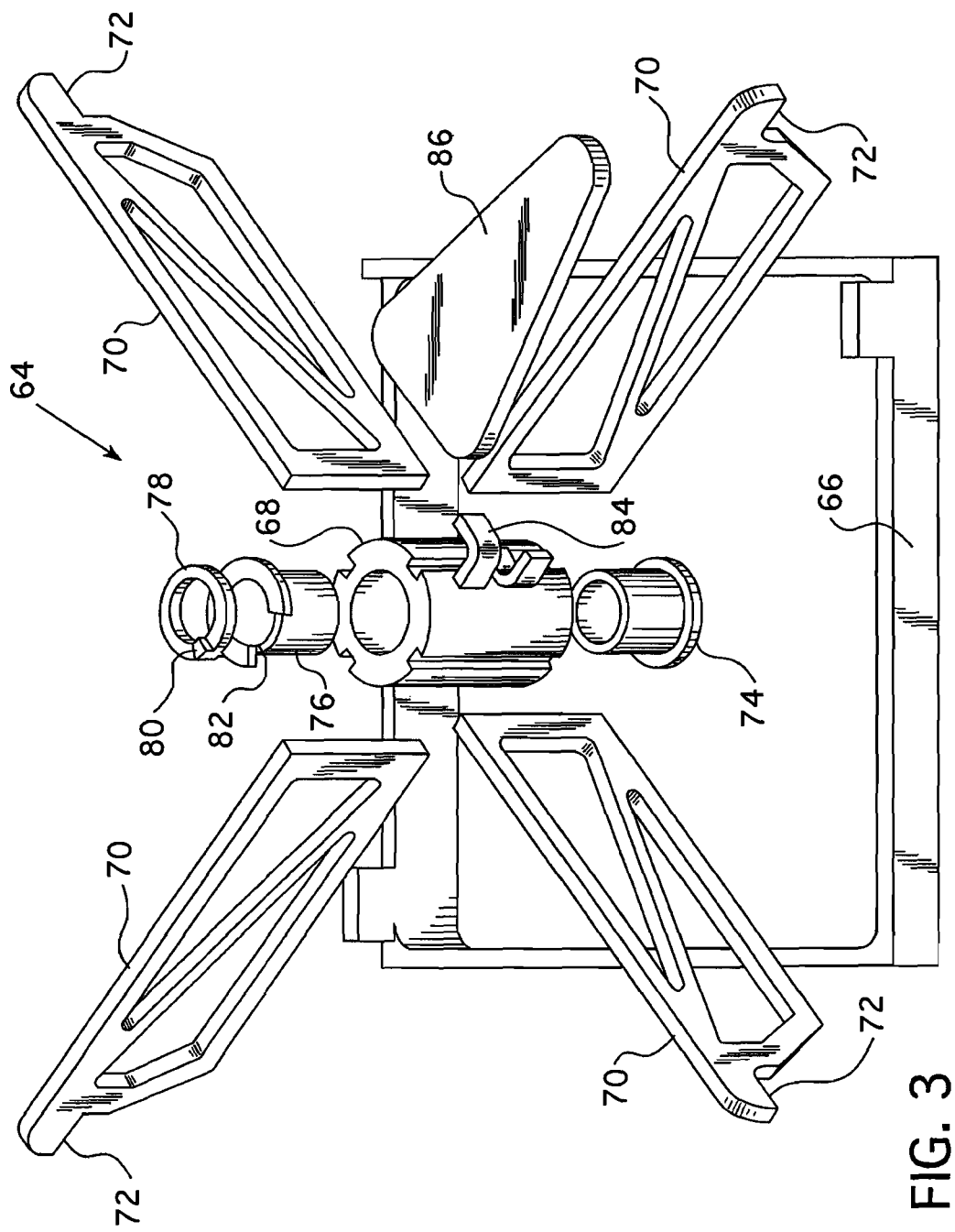
FIG. 3 is an exploded view of the frame and wheel track of the inspection fixture shown in FIG. 2.

The inspection fixture 62 features a cross-member frame 64 and wheel track 66 that is shown in more detail in the exploded view shown in FIG. 3. The frame has a central hub 68 with four flukes or struts 70 that are spaced 90° apart around the hub 68 and extend out radially. The struts 70 have support ledges 72 that are designed to sit on the top surface of the walls of the fuel assembly openings in the top guide. The central hub 68 has a lower sleeve bearing 74 and a modified upper sleeve bearing 76 that accommodates rotation of the central shaft 60 that passes therethrough. A hard stop floating ring 78 is connected to the central shaft 60 and includes a raised land 80 that cooperates with a notch 82 in the flange of the upper bearing 76 to limit rotation of the central shaft to a little more than one full revolution, i.e., approximately 380°. The approximately 380° rotation from hard stop to hard stop assures an overlap of the inspection area for full coverage. The hard stops are desirable to prevent the device, e.g., camera cable, from becoming entangled should the user continue performing all remaining inspections in the same direction and not reset the fixture after a full rotation, to a "home" position. Two cable restraint hooks 84 are located on the hub 68 of the frame to properly secure a video (or other sensor) cable and prevent the cable from having excessive or insufficient slack. A home position visual indicator 86 is located on the top side of the frame to provide feedback of the relative camera location during operation. A wheel track 66 is welded to the frame and sits within the fuel assembly opening just below the top surface of the top guide when the frame is in position. Preferably, the wheel track 66 is a rectangle and more desirably a square, to follow the inside surface of the fuel assembly opening so as to guide a camera 88 in a camera support bracket 90, around the underside of the walls of the fuel assembly opening in the top guide.

The central shaft 60 comprises an upper J-slot sleeve 58, an upper central shaft member 92, a linkage assembly sleeve 94 and a lower shaft member 97 each of which are fixedly coupled together end to end, such as by welding, with the pins 98 serving to assure that there is no rotation of slippage. The weight of the camera support bracket 90 is carried by a shaft collar assembly 100 which is secured to the lower central shaft member 96. The height of the shaft collar assembly 100 on the lower central shaft member 96 is adjustable so that the camera support bracket 90 can be raised or lowered to adjust for different top guide configurations. The markings 102 on the lower central shaft 96 are provide to identify the height adjustments for specific top guide designs. A slotted camera bracket 104 connects the camera support bracket 90 with the lower central shaft member 96 and permits lateral movement of the camera support bracket as a cam follower 124 connected to the camera support bracket 90 through a distal linkage block 110 follows the wheel track 66 as will be explained hereafter.

Figure 4:
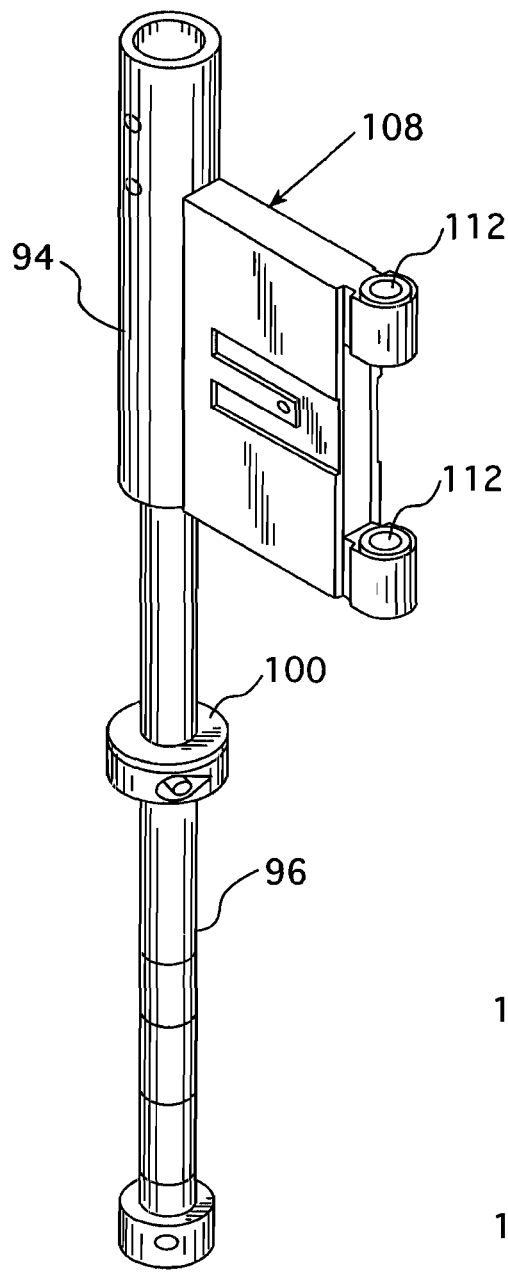
FIG. 4 is a perspective view of a portion of the central shaft and the link assembly that is connected directly to the central shaft of the inspection fixture of this invention.
Figure 5:
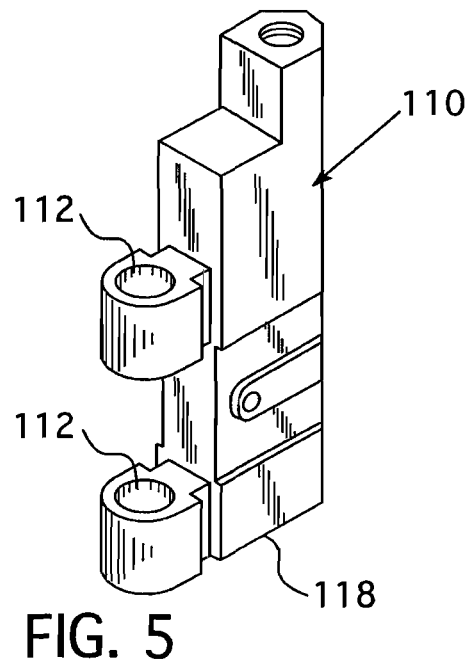
FIG. 5 is a perspective view of the distal end of the link assembly which is hingedly attached to the portion of the link assembly shown in FIG. 4.

A linkage assembly 106 generally comprises the sleeve 94, first linkage block 108 and second, distal linkage block 110. First linkage block 108 is more fully shown in FIG. 4 and is welded to the linkage assembly sleeve 94 to form an integral member. Second or distal linkage block 110 is better shown in FIG. 5. First linkage block 108 is connected to second linkage block 110 through a hinged coupling 112 which is pivotably coupled by linkage pin 114. The hinged coupling 112 includes a torsion spring 116 that returns the hinge orientation to a neutral position, i.e., 0° offset between the first linkage block 108 and the second linkage block 110. The bottom side of the second linkage block has a hole 118 for one end of a slip fit rod 120 that allows for rotational movement. The other end of the slip fit rod 120 is fixedly connected to the top of the camera bracket 90 to maintain the fixed orientation of the camera bracket. A hole 122 in the upper end of the second linkage block 110 seats the shaft of the cam follower 124. The cam 124 rides on the inside surface of the wheel track 66.

As the central shaft 60 is manually rotated with the small handling pole 52, the configuration of the fixture 62 ensures that the camera position is always in the same position as the cam roller 124. It should be appreciated that while the fixture is stated as supporting a camera 88, other nondestructive sensors can also be supported by this fixture to examine the state of the top guide. As previously mentioned, a hard stop ring 78 is positioned on the central shaft 60 to limit the fixture to one full revolution, which prevents the camera cable from binding in the fixture, as well as gives mechanical feedback for beginning and ending the inspection.

The fixture positions the camera such that inspections performed through the fixture of this invention are within BWRVIP requirements for a VT-1 examination. This includes the relation of the camera viewing angle to the inspection surface (less than 30° from the perpendicular angle between the surface and the camera field of view) as well as inspection distance (15.24 cm from the inspection surface). For an inspection to be performed, the top guide cell (i.e., the fuel assembly opening) designated for inspection must be fully evacuated of all fuel assemblies, control rod blades, double blade guides and/or single blade guides. Fuel assemblies, double blade guides, and/or single blade guides located in immediately adjacent cells do not require evacuation to perform inspections as there will be no contact or interference with any of these objects. The foregoing fixture of this invention will also not interfere or make contact with any instrumentation, such as local power range monitors.

To accommodate five different set-ups respectively required for all BWR/2-6 top guide designs, three different length rods 120 may be used. Each rod is designed to maintain significant contact in the slip fit hole 118 on the distal block 110 of the linkage while allowing vertical adjustment depending on the position of the shaft collar 100. The lower central shaft member 96 that holds the shaft collar 100 has small grooves 102 to indicate where to properly position the shaft collar depending on the top guide being inspected. Once the fixture is configured for a particular set-up, all intended inspections can be performed without any further alteration, modification, or manipulation of the set configuration. The main construction materials employed for the various components in this embodiment are formed from 300 series stainless steel and 6061 aluminum for corrosion resistance. Thus, the fixture of this invention provides for a smooth inspection with a known camera angle and distance from the inspection piece, as well as provides rigidity to keep flow induced impact to the inspection at a minimum, if not entirely eliminated.

Figure 6:
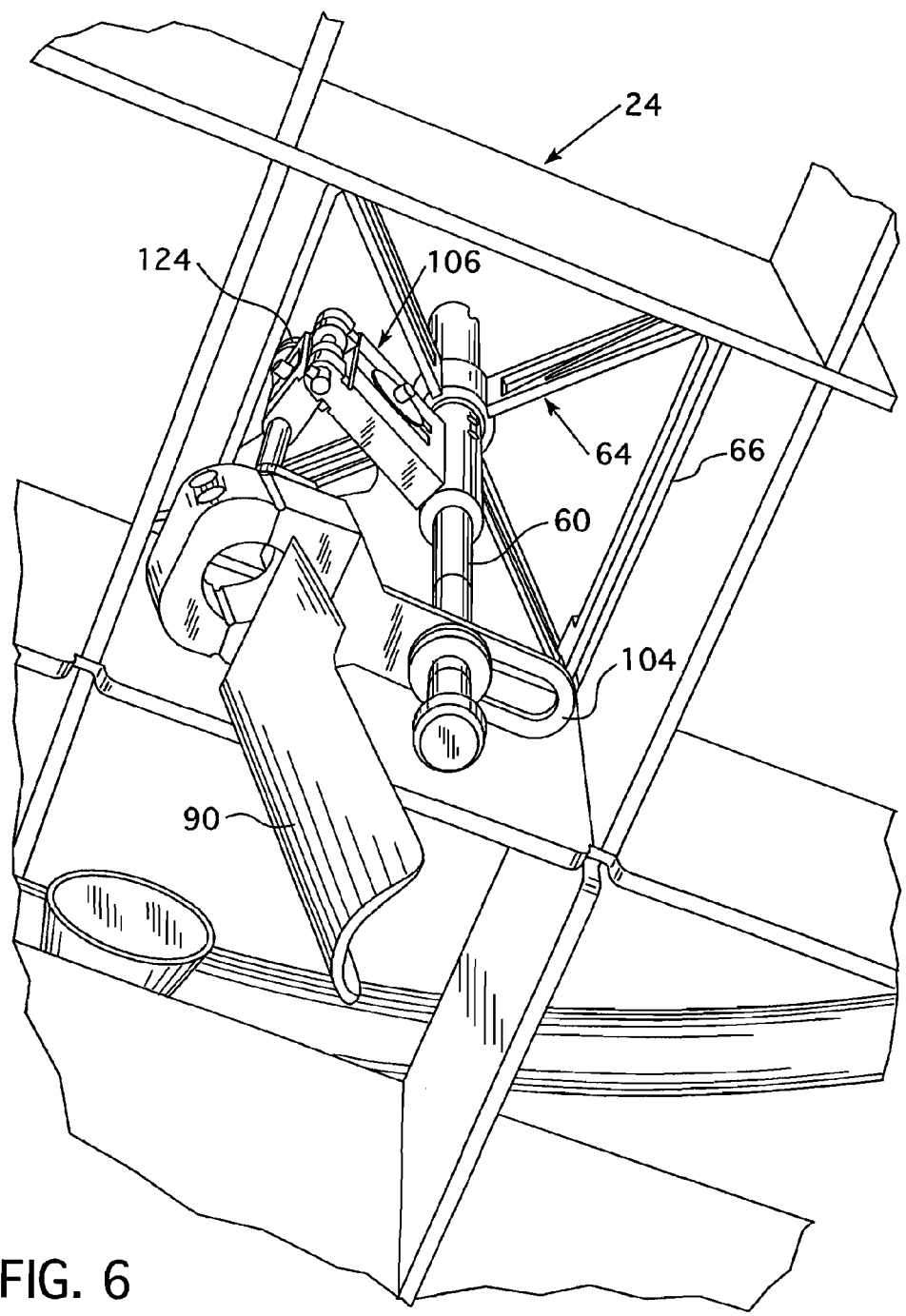
FIG. 6 is a perspective view of the underside of the fixture of this invention in place within the fuel assembly opening of a top guide, with the inspection sensor bracket in a first orientation.
Figure 7:
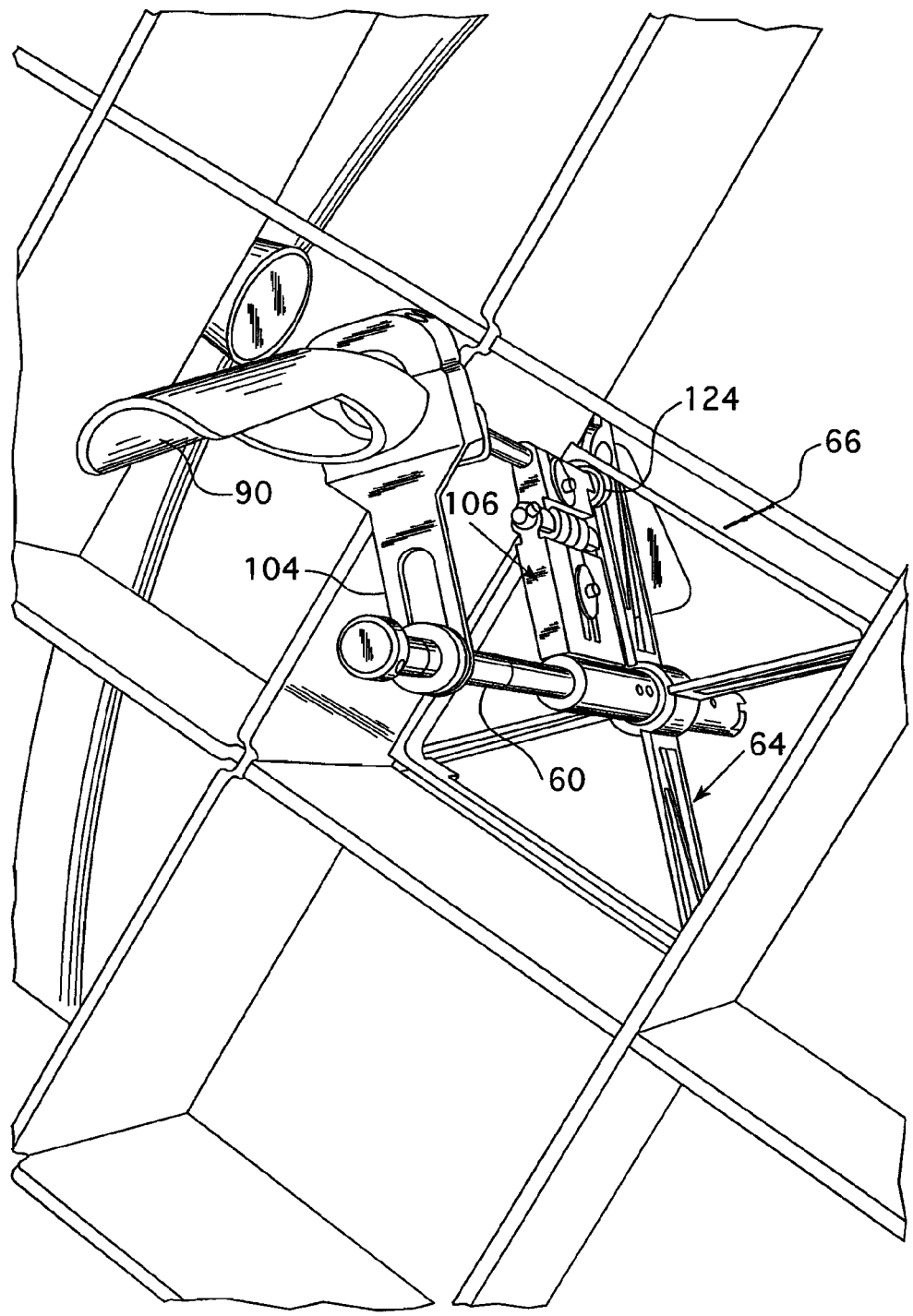
FIG. 7 is a perspective view of the inspection fixture of this invention shown in FIG. 6, in a second orientation.

FIG. 6 provides a perspective view of the fixture of this invention installed on the top guide with the cam 124 at a mid location along a straight rail of the wheel track 66 as the camera support 90 surveys the underside of the top guide 24. FIG. 7 is a perspective view of the fixture shown in FIG. 6 with the cam wheel 124 in a corner location of the wheel track 66. FIGS. 6 and 7 give a better appreciation of the functioning of the linkage assembly 106 as the hinge coupling 112 bends to accommodate the straight portions of the wheel track 66.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An inspection fixture for a top guide of a boiling water reactor comprising:
    a frame sized to rest and be supported on a top edge of a fuel assembly opening within the top guide;
    a wheel track supported from said frame in a manner to extend around a periphery of the fuel assembly opening, substantially proximate a border thereof when the frame is supported on the top edge of the fuel assembly opening;
    a central shaft rotatably supported from the frame extends down below the fuel assembly opening, substantially along an axis of a fuel assembly to be positioned below the opening, when the frame is supported on the top edge of the fuel assembly opening;
    a linkage bracket fixedly connected to the central shaft extends laterally therefrom with a hinged distal link having a hinge line substantially parallel to and spaced from the central shaft;
    a cam follower that rides on the wheel track and is supported from the distal link; and
    an inspection device bracket connected at a fixed angle between the central shaft and the distal link.

2. The inspection fixture of claim 1 including a hard stop ring for preventing the central shaft from rotating more than approximately 380 degrees.

3. The inspection fixture of claim 1 wherein the hinged distal link is spring biased in a preselected orientation.

4. The inspection fixture of claim 3 wherein the preselected orientation is at an angle of zero degrees with another portion of the linkage bracket between the hinge line and the central shaft.

5. The inspection fixture of claim 1 including a video camera that sits in the inspection device bracket.

6. The inspection fixture of claim 1 wherein the wheel track is substantially rectangular.

7. The inspection fixture of claim 6 wherein the wheel track is substantially square.

8. The inspection fixture of claim 1 wherein the wheel track is suspended by the frame within the fuel assembly opening within the top guide when the frame rests on the top edge of the fuel assembly opening.

9. The inspection fixture of claim 8 wherein the wheel track sits just below the top surface of the top guide when the frame rests on the top edge of the fuel assembly opening.

10. The inspection fixture of claim 1 including a coupling at an upper end of the central shaft for coupling with a drive means for rotating the central shaft.

11. The inspection fixture of claim 10 including a pole for connecting to the coupling for positioning the inspection fixture on the top edge of the fuel assembly opening and rotating the central shaft.

* * * * *